UNITED STATES PATENT OFFICE.

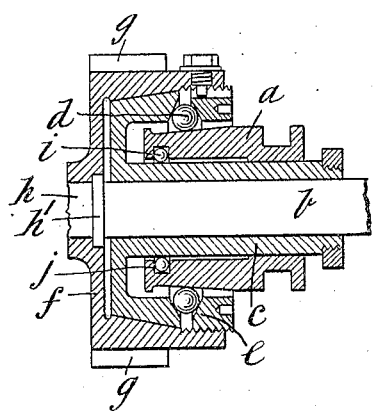

JOSEPH ABRAHAM DIXON, OF COVENTRY, ENGLAND.

CLUTCH OR BRAKE.

No. 887,779.  Specification of Letters Patent.  Patented May 19, 1908.

Application filed August 6, 1906. Serial No. 329,341.

*To all whom it may concern:*

Be it known that I, JOSEPH ABRAHAM DIXON, a subject of the King of Great Britain, residing at 207 Stoney Stanton road, Coventry, in the county of Warwick, in England, have invented new and useful Improvements in or Relating to Clutches or Brakes, of which the following is a specification.

My invention relates to improvements in or relating to clutches or brakes, and consists of a means of reducing considerably the end thrust caused by the pressure necessary to enable the friction surfaces of said clutch or brake to grip each other, and at the same time obtaining a certain amount of flexibility or smoothness of action. I attain these objects by the mechanism illustrated in the accompanying drawings, in which—

Figure 1, is a vertical section of the clutch or brake used in connection with a spur wheel. $a$ is the sliding or actuating cone mounted on a square shaft $b$ with a friction cone $c$ in between, to this friction cone $c$ balls $d$ operate in a groove formed between the edges of the friction cone $c$ and the ring $e$ which is screwed to the spur wheel $f$ with any number of teeth $g$, the aforesaid spur wheel revolves around the shaft $h$ and collar $h'$. Ball bearings $i$ are provided in a groove $j$ of the sliding or actuating cone $a$.

Fig. 2, is a vertical section of the clutch or brake adapted for motor vehicles. The top half shows the clutch $k$ in action. The bottom half shows the clutch $k$ out of action. $l$ is the sliding or actuating cone which is mounted on a shaft $m$, the said cone being operated by levers over the pins $n$ on the ring $o$ which is provided with a thrust ball bearing $p$. A collar $q$ is screwed to cone $l$, and a collar $r$ is fixed on the shaft $m$. Balls $s$ are provided in a groove formed between the ring $t$ and the screwed ring $u$. On the ring $u$ I screw a flanged ring $v$ and to this said flanged ring I rivet a plate $w$, this said plate $w$ is screwed to the flywheel $x$ which revolves with the shaft $a'$. A collar $y$ is provided which is movable upon the shaft, and it is bolted to the clutch $k$. Slots $a''$ are provided in the ring $u$ for adjusting purposes. Flywheel $x$ is keyed to shaft $a'$ and locked by locknut $z$.

Fig. 3, is a half vertical section of an alternate method of using rollers $b^e$ of any number instead of balls. The aforesaid rollers $b'$ are mounted on carriers $c'$ inserted in a ring $d'$ with rollers $e'$ operating between the conical rings $f'$ and $g'$. The rollers $b'$ are operated by the actuating sleeve $h''$ mounted on the shaft $i'$ between the collar $j'$ and the collar $j''$.

Fig. 4, is a section on line A B of Fig. 3.

Fig. 5, is a section showing where the ring $l'$ is conical and the ring $m'$ is straight to receive the balls $n'$ on the sleeve $o'$.

This device as hereinbefore and hereinafter described is not confined to any particular form of clutch or brake, but it can be used to great advantage in connection with a conical friction clutch or brake, in which two members one with external conical friction surface, and the other with internal conical friction surface, are pressed together causing both to rotate together when the said friction surfaces are in contact with each other. The said device consists of a plate, fixed in a suitable manner to one of the said members, of suitable material and dimensions, so as, to be flexible in cases where flexibility is desired, when taking up the said end thrust. To this plate is attached a ring with a conical surface, a similar ring being attached to the other member, the two last said conical surfaces forming a V shaped circular groove into which balls, rollers, or other suitable circular objects, but preferably balls are placed. When the said balls are pressed between the last said conical surfaces, the said surfaces are forced apart, causing the former mentioned friction surfaces to grip each other; the aforesaid balls are pressed into the said V shaped groove or between the conical surfaces, by means of a sliding cone which is moved against the opposite side of the balls, causing them to widen the said groove, and so operate the clutch or brake herein described. One of the said rings is provided with a means of adjustment for wear, which consists of a means for decreasing the width of the said groove, when it becomes too wide through the wearing of the said friction surfaces.

The above described plate may inclose the internal parts of the clutch or brake, and each inclosure may contain grease or any other lubricant, thus preventing the friction surfaces gripping too suddenly, also preventing rapid wear.

The above described device may be employed to release, instead of putting into action the friction surfaces of a clutch or brake; for instance, the friction surfaces of a conical friction clutch may be forced together by means of one or more springs, and the above device may be employed to separate them.

In each of the cases above described the actuating cones may when releasing a clutch be forced against a collar, (for example take collar r in Fig. 2,) thereby moving and keeping out of action clutch or friction cone k. The same thing applies in each case.

A simple stop or brake may be arranged in connection with shafts b Fig. 1, m Fig. 2, and i' Fig. 3, to bring same to rest more quickly if desired.

The above described device may be employed in connection with any mechanism where a clutching, braking or gripping action is desired.

What I do claim as my invention, and desire to secure by Letters Patent, is—

1. The combination of a pair of clutch members, one of which is movable axially relatively to the other, an adjustable ring carried by one member and forming with the other member an annular groove opening toward the axis of rotation of the clutch, an axially movable cone, adapted to pass through said ring and anti-frictional members arranged in the groove and in contact with the outer face of the cone and adapted to be forced outwardly by the cone, to move one clutch member relatively to the other.

2. The combination with a shaft, of a fly wheel having an integral clutch face and rigidly secured to the shaft, a second shaft, a second clutch member movably carried by the second shaft and arranged within the fly wheel, a plate secured to the fly wheel and inclosing the clutch member, a flanged ring secured to the plate about the second-mentioned shaft, an adjustable ring having screw connection with the flanged ring, formed to provide a groove between it and the axially movable clutch member, an axially movable cone on the second shaft adapted to pass through the ring, and anti-frictional members lying in the groove and in contact with the outer wall of the axially movable cone.

3. The combination with a shaft, of a fly wheel having an integral clutch face and rigidly secured to the shaft, a second shaft, a second clutch member movably carried by the second shaft, and arranged within the fly wheel, a plate secured to the fly wheel and inclosing the clutch member, a flanged ring secured to the plate about the second-mentioned shaft, an adjustable ring, having screw connection with the flanged ring formed to provide a groove between it and the axially movable clutch member, an axially movable cone on the second shaft, adapted to pass through the ring, and anti-frictional members lying in the groove and in contact with the outer wall of the axially movable cone, and a ring carrying pins and having a thrust ball-bearing connection with the cone.

In testimony whereof I have signed my name to this specification in the presence of two subscribing witnesses.

JOSEPH ABRAHAM DIXON.

Witnesses:
  GEO. HENDLEY,
  ALBT. PERCY SIMPSON.